United States Patent
Horst et al.

(10) Patent No.: US 6,799,098 B2
(45) Date of Patent: *Sep. 28, 2004

(54) REMOTE CONTROL SYSTEM FOR A LOCOMOTIVE USING VOICE COMMANDS

(75) Inventors: Folkert D. Horst, Pierrefonds (CA); Stephan P. Georgiev, St-Hubert (CA); Brigide Mattar, Ville Mont-Royal (CA)

(73) Assignee: Beltpack Corporation, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/328,517

(22) Filed: Dec. 23, 2002

(65) Prior Publication Data

US 2003/0097210 A1 May 22, 2003

Related U.S. Application Data

(63) Continuation-in-part of application No. 10/222,560, filed on Aug. 16, 2002, now Pat. No. 6,697,716, which is a continuation of application No. 09/653,651, filed on Sep. 1, 2000, now Pat. No. 6,466,847.

(51) Int. Cl.[7] .................................................. G06F 7/00
(52) U.S. Cl. ...................... 701/19; 701/20; 246/187 A; 246/187 C; 704/275
(58) Field of Search ............................... 701/19, 20, 29; 246/187 A, 187 C; 340/825.69, 825.72; 704/275

(56) References Cited

U.S. PATENT DOCUMENTS

| 4,641,292 A | * | 2/1987 | Tunnell et al. ............... 367/198 |
| 4,725,956 A | * | 2/1988 | Jenkins .......................... 701/2 |
| 4,872,195 A | | 10/1989 | Leonard |
| 4,893,240 A | | 1/1990 | Karkouti |
| 5,511,749 A | * | 4/1996 | Horst et al. .............. 246/187 A |
| 5,685,507 A | * | 11/1997 | Horst et al. .............. 246/187 A |
| 5,832,440 A | * | 11/1998 | Woodbridge et al. ....... 704/275 |
| 6,449,536 B1 | | 9/2002 | Brousseau et al. |
| 6,456,674 B1 | | 9/2002 | Horst et al. |
| 6,466,847 B1 | | 10/2002 | Horst |
| 6,470,245 B1 | | 10/2002 | Proulx |

FOREIGN PATENT DOCUMENTS

| DE | 197 43 306 A1 | 4/1999 |
| EP | 0 971 330 | 1/2000 |
| JP | 60059901 | 4/1985 |
| WO | 99/05015 | 2/1999 |

* cited by examiner

Primary Examiner—Gertrude A. Jeanglaude
(74) Attorney, Agent, or Firm—Merchant & Gould, P.C.

(57) ABSTRACT

A remote control system for a locomotive. The remote control system includes a lead controller and follower controller connected to one another over a wireless communication link. The lead controller issues commands over the wireless communication link and those commands are implemented by the follower controller mounted on-board the locomotive. The lead controller is responsive to voice commands uttered by the operator.

40 Claims, 5 Drawing Sheets

REMOTE CONTROL SYSTEM FOR A LOCOMOTIVE USING VOICE COMMANDS

CROSS REFERENCE TO RELATED APPLICATIONS

This application is a continuation-in-part of U.S. patent application Ser. No. 10/222,560 filed Aug. 16, 2002, now U.S. Pat. No. 6,697,716, which is a continuation of U.S. patent application Ser. No. 09/653,651 filed Sep. 1, 2000 and issued Oct. 15, 2002 as U.S. Pat. No. 6,466,847. The contents of the above documents are incorporated herein by reference.

FIELD OF THE INVENTION

The present invention relates to components of a system for remotely controlling a locomotive. More particularly, the system is characterized by the ability to accept voice commands from a human operator.

BACKGROUND OF THE INVENTION

Systems for remotely controlling a locomotive are known in the art. For a reference, the reader is directed to the U.S. Pat. Nos. 5,511,749 and 5,685,507 that have been granted to Canac International Inc. on Apr. 30, 1996 and Nov. 11, 1997 respectively. The contents of the above documents are hereby incorporated by reference. Broadly stated, a remote control system for a locomotive has two main components, namely a lead controller and a follower controller. The follower controller is placed in the locomotive and it receives commands sent by the lead controller over a wireless communication link. The lead controller is in the form of a module that can be carried by a human operator located at a certain distance from the locomotive or the train pulled or pushed by the locomotive. When the operator wishes to move the locomotive in a certain direction, he or she manipulates controls on the lead controller to establish desired parameters such as direction of movement, speed, etc. The command is encoded and sent by the lead controller over the wireless communication link to the follower controller. The follower controller processes the command and generates local control signals that are applied to the locomotive to implement the command.

The human operator that controls the locomotive remotely should at all times follow visually the movement of the locomotive such as to stop the locomotive if a hazardous condition suddenly develops.

Currently existing remote control systems for a locomotive use lead controllers that have manually operated controls. Stated otherwise, the operator must press switches, buttons or turn dials in order to enter the desired command. During the time necessary to operate the controls on the lead controller, the operator cannot visually maintain contact with the moving locomotive. For the reasons mentioned earlier, this constitutes a disadvantage. In addition, the hands of the operator are kept busy which prevents him from performing other useful tasks.

Against this background, it appears that there exists a need in the industry to develop a remote control system for a locomotive that limits or reduces the amount of time during which an operator must break visual contact with the moving locomotive in order to enter a command on the lead controller as well as allow greater flexibility in manual operations.

SUMMARY OF THE INVENTION

In accordance with a first broad aspect, the invention provides a follower controller module adapted for mounting on board a locomotive. The follower controller module includes a processing module for receiving a signal indicative of a spoken utterance and generating data indicative of a command to be executed by the locomotive in response to this signal. The follower controller module is responsive to the data indicative of a command to be executed by the locomotive for generating local control signals for transmission to the locomotive such as to cause the locomotive to execute the command.

In accordance with a second broad aspect, the invention provides a remote control system for a locomotive. The remote control system comprises a portable lead controller module, a follower controller module mounted onboard a locomotive and a processing module. The lead controller module and the processing module are operative to establish a wireless communication link therebetween for exchanging data. The lead controller module receives a signal derived from a spoken utterance and transmits the signal over the wireless communication link to the processing module. The processing module receives from the lead controller the signal derived from a spoken utterance and, in response to the signal, generates data indicative of a command to be executed by the locomotive. The processing module transmits the data to the follower controller module. The follower controller module is responsive to the data for generating local control signals for application to the locomotive in order to cause the locomotive to execute the command.

In accordance with yet another broad as aspect, the invention provides a processing module adapted to process voice signals suitable for use in a locomotive remote control system. The processing module includes a first port, a processing unit and a second port. The first port is adapted for receiving over a wireless communication link a signal derived from a spoken utterance. The processing unit processes the signal derived from a spoken utterance received at the first port to generate data indicative of a command to be executed by a locomotive. The second port is adapted for releasing the data indicative of a command to be executed by the locomotive to a follower controller module mounted on board the locomotive.

In a specific implementation, the signal derived from the spoken utterance received at the first port is issued by a lead controller module. In a non-limiting implementation, the first port is adapted to receive a plurality of signals issued by a plurality of distinct lead controller modules, wherein each of the plurality of signals is derived from a respective spoken utterance. Each lead controller module in the plurality of distinct lead controller modules is associated to a corresponding follower controller module selected from a plurality of follower controller modules. In response to each of the plurality of signals, the processing module is operative for generating data indicative of a command to be executed by a locomotive and transmitting the data generated to a follower controller module selected from a plurality of follower controller modules. The selected follower controller module corresponds to the lead controller module which transmitted the signal from which the data indicative of a command was generated.

BRIEF DESCRIPTION OF THE DRAWINGS

A detailed description of examples of implementation of the present invention is provided hereinbelow with reference to the following drawings, in which.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

As will be described in more detail below, the remote control system in accordance with an example of implementation of the invention includes three main components, namely a lead controller module 12, a processing module 13, and a follower controller module 14 mounted onboard a locomotive 10.

In use, an operator formulates a spoken utterance and enters a voice command at the lead controller module 12, which is located remotely from the locomotive 10. A signal indicative of the user's spoken utterance is then transmitted over a wireless link 16 to the processing module 13, where it is processed in order to generate data indicative of a command to be implemented by the locomotive 10. This data is then communicated to the follower controller module 14, and on the basis of that data, the follower controller module 14 issues local control signals to the locomotive 10 such as to implement the commands uttered by the user.

Figure 1:
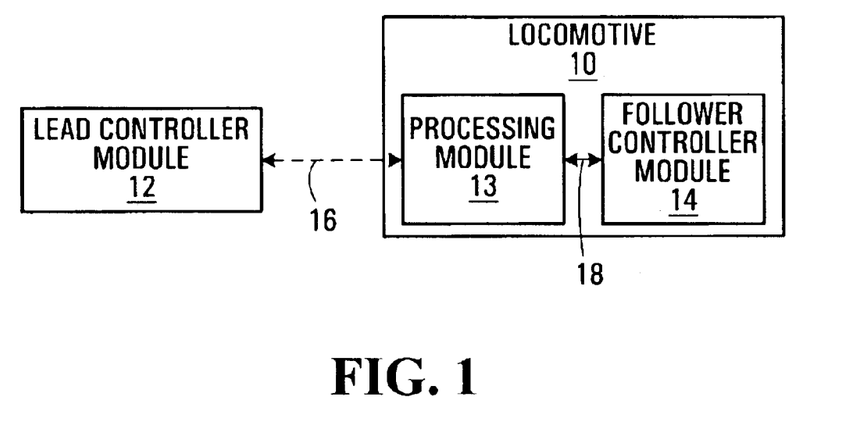
FIG. 1 is a block diagram of a remote control system for a locomotive in accordance with a first specific implementation of the present invention.

In a first specific example of implementation shown in FIG. 1, the processing module 13 is positioned locally at the locomotive 10. In this specific example of implementation, the lead controller 12 is in communication with the processing module 13 via a wireless communication link 16 and the follower controller module 14 is in communication with the processing module 13 via communication link 18.

Communication link 18 may be a wireless communication link or a wire-line communication link (including an optical link). In a possible variant, the processing module 13 is included within the follower controller module 14, such that its components and functionality are part of the components and functionality of the follower controller module 14.

Figure 2:
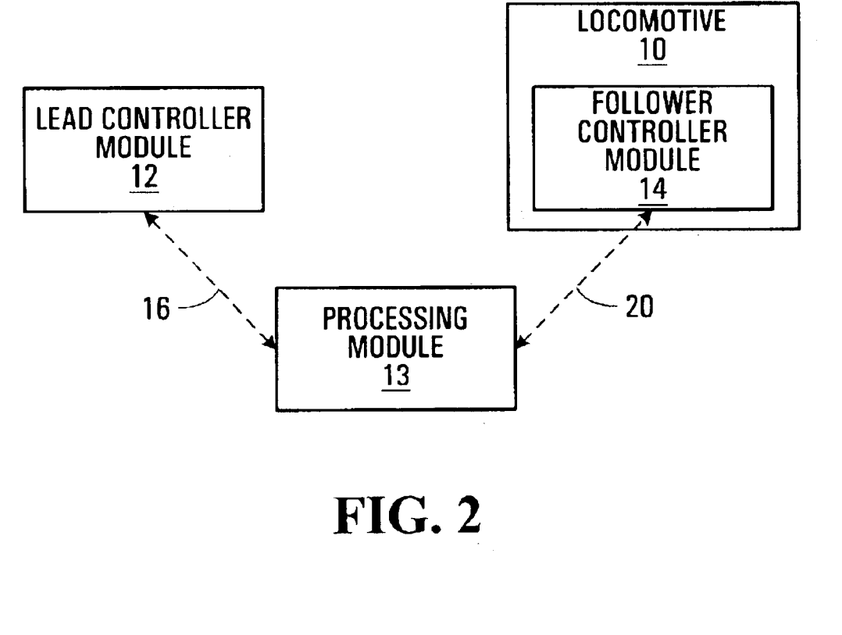
FIG. 2 is a block diagram of a remote control system for a locomotive in accordance with a second specific implementation of the present invention.

In a second specific example of implementation shown in FIG. 2, the processing module 13 is remote from both the lead controller module 12 and the locomotive 10. In this specific example of implementation, the lead controller 12 is in communication with processing module 13 via a wireless communication link 16, and the follower controller module 14 is also in communication with processing module 13 via a communication link 20. Communication link 20 is preferable a wireless communication link. This example of implementation (shown in FIG. 2) allows for the processing unit 13 to be shared between multiple lead controller module/follower controller module pairs, thereby reducing the number of processing modules 13 required.

For example, it is within the scope of the invention for processing module 13 to be located at a central entity such that it is capable of processing multiple speech signals received from a plurality of different lead controller modules. In such a scenario, the lead controller modules transmit their respective signals to the processing module 13, which is located at the central entity. The processing module 13 then processes the plurality of speech signals in order to generate data indicative of commands to be implemented at respective follower controller modules. Once the signals are processed, the processing module 13 transmits the appropriate data to the respective follower controller modules. The processing of the multiple speech signals by processing module 13 may be effected using time sharing protocols of the processing capabilities of the processing module 13 or, alternatively, by providing a processing module 13 having parallel processors.

Figure 3:
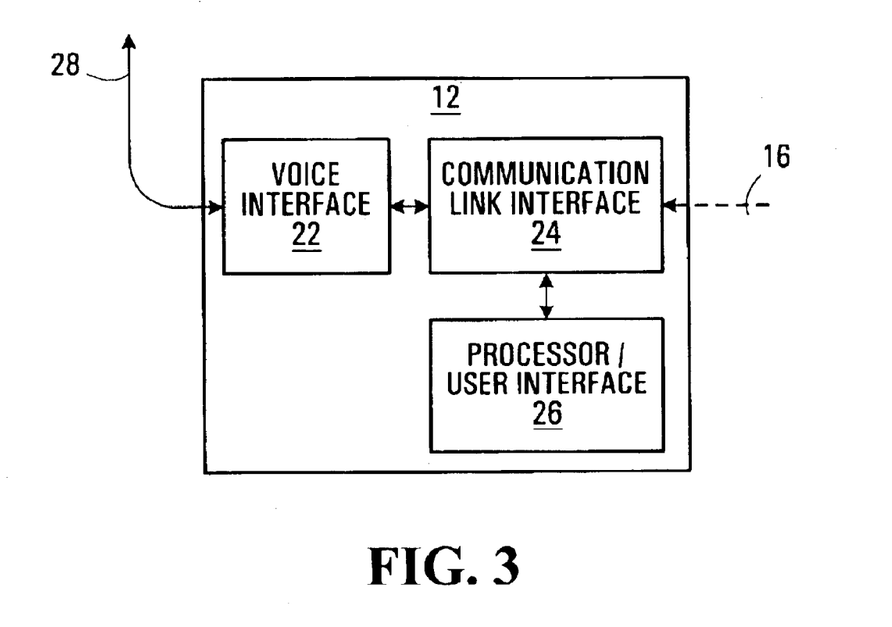
FIG. 3 is a block diagram of the lead controller module of the remote control system depicted in FIGS. 1 and 2.

A detailed block diagram of a specific example of implementation of the lead controller module 12 is shown in FIG. 3. In this example of implementation, the lead controller module 12 includes three main components; namely a voice interface 22, a communication link interface 24 and a processor/user interface 26. The voice interface 22 has an input 28 for receiving voice commands from the operator. In practice, the signal received from input 28 is the output of a microphone. The signal from input 28 is of analog nature and is derived from a spoken utterance.

In a first specific example of implementation, the analog signal is passed directly from the voice interface 22 to the communication link interface 24, which transmits the signal derived from the spoken utterance over wireless communication link 16 towards processing module 13. It is within the scope of the invention for lead controller module 12 to be embodied in a cellular telephone, a walkie talkie, a radio transmitter or any other device that enables voice signals to be transmitted over a wireless communication link.

Alternatively, in a second specific example of implementation, the lead controller 12 includes an analog to digital converter (not shown in FIG. 2) for converting the analog signal from input 28 into a digital signal. The digital signal is then passed from the analog to digital converter to the communication link interface 24, which transmits the digital signal over wireless communication link 16 towards processing module 13.

Figure 4:
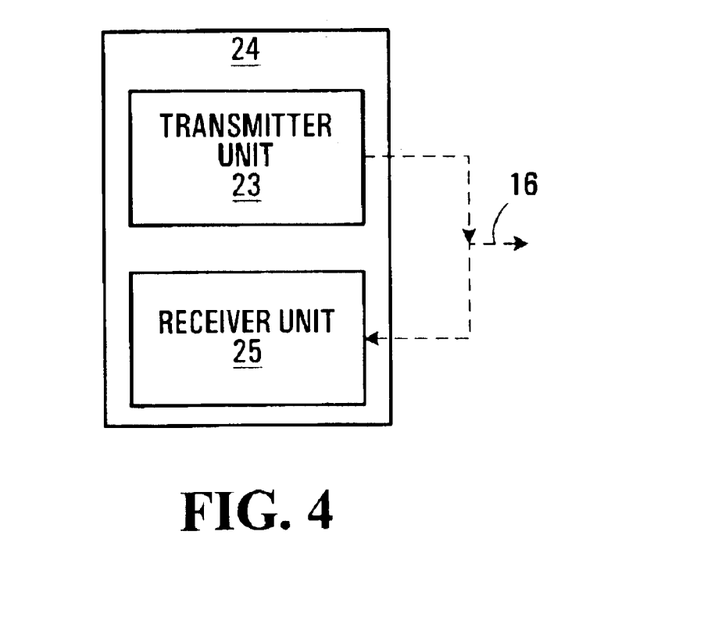
FIG. 4 is a block diagram of a communication link interface of the lead controller shown in FIG. 3.

An example of implementation of the communication link interface 24 is shown in FIG. 4. The communication link interface 24 includes a transmitter unit 23 and a receiver unit 25. Signals issued from the voice interface 22 are passed to the transmitter unit 23 for modulation and any other suitable processing that needs to be done such that they can be transported over the wireless communication link 16.

Similarly, signals in the wireless communication link 16 directed towards the lead controller module 12 are passed to the receiver unit 25 for demodulation prior to being passed to the component of the lead control module 12 designed to process them, such as the processor/user interface 26, for example. As will be described in more detail further on, processor/user interface 26 could include such things as a text to speech converter, a display screen, speakers and buttons and levers amongst others.

It is also within the scope of the invention for receiver 25 to be able to receive signals from a communication link other than communication link 16. For example, this could be the case if receiver unit 25 operates at a different frequency from transmitter 23.

Figure 5:
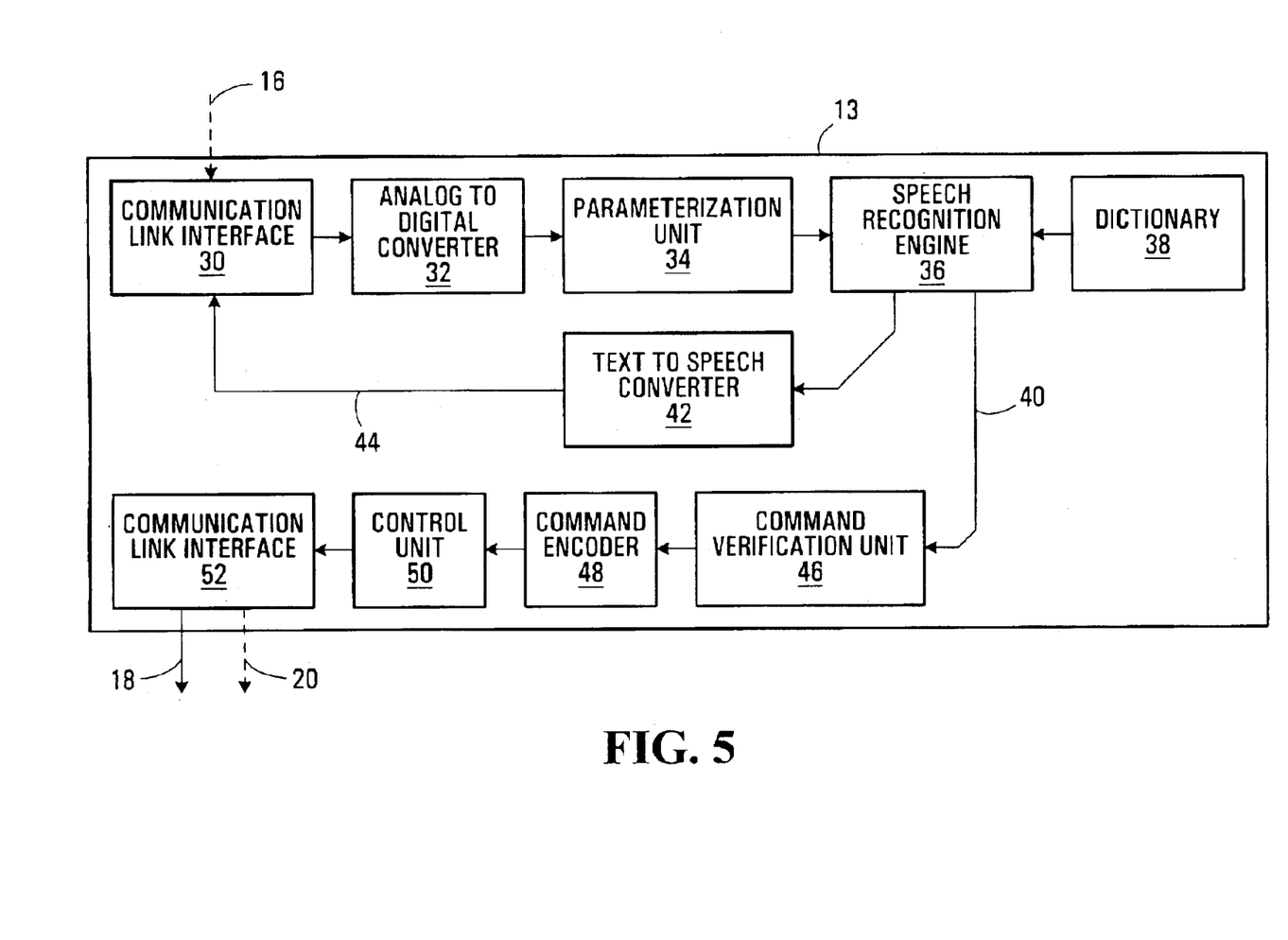
FIG. 5 is a block diagram of a processing module as shown in FIGS. 1 and 2.

Shown in FIG. 5 is a specific example of implementation of processing module 13. Processing module 13 includes a communication link interface 30 which is able to transmit and receive signals over wireless communication link 16. Communication link interface 30 has a similar structure to that of communication link interface 24 shown in FIG. 4, and as such will not be described in more detail herein.

It is communication link interface 30 that receives the signal derived from a spoken utterance that is transmitted from the lead controller unit 12 towards the processing module 13 over communication link 16. In the case where the signal that was transmitted from the lead controller module 12 is still in analog form, then the signal is applied to an analog-to-digital converter 32 that digitizes the signal according to a Pulse Code Modulation (PCM) technique or according to any other suitable method. In the case where the lead controller module 12 includes an analog to digital converter, such that the signal is already in digital from when it arrives at the processing module 13, then the signal can skip the processing by the analog to digital converter 32. Alternatively, the processing module 13 does not include an analog to digital converter 32 at all.

The digital signal is then applied to a parameterization unit 34 whose task is to extract from the audio signal containing the speech information, speech feature elements on which further speech processing can be performed. Examples of speech feature elements include feature vectors, spectral parameters, audio signal segments, band energies and cepstral parameters, among others. It is not deemed necessary to describe in detail the structure and operation of the parameterization unit 34 since such a component is well known to those skilled in the art of speech processing.

The feature elements extracted by the parameterization unit 34 are passed to a speech recognition engine 36. Any suitable commercially available speech recognition engine 36 can be used without departing from the spirit of the invention. The speech recognition engine 36 works in conjunction with a speech recognition dictionary 38 that contains a list of vocabulary items that the speech recognition engine 36 can recognize. In use, when the speech recognition engine 36 receives the feature elements generated by the parameterization unit 34, it generates at output 40 data that represents the vocabulary item best matching the spoken utterance characterized by the feature elements.

In a specific implementation, the vocabulary items held in the speech recognition dictionary 38 reflect the commands that the processing module 13 should be able to recognize.

For better recognition performance, the speech recognition engine 36 is speaker dependent. In other words, the speech recognition engine 36 is trained from speech tokens from a specific speaker such that the speech recognition engine better adapts to the characteristics of the speaker. Alternatively, a speaker-independent speech recognition engine can be used without departing from the spirit of the invention.

The recognition result is released by the speech recognition engine 36 at output 40. In one specific example of implementation, the recognition result is the vocabulary item found as being the best match to the spoken utterance, expressed in orthographic form. Other types of representations of the recognition results can be used without departing from the spirit of the invention.

In a first specific example of implementation, the recognition results are input into a text to speech converter 42 that synthesizes an audio signal and directs the signal over pathway 44 back to communication link interface 30. Communication link interface 30 then transmits the signal back to lead controller module 12 over wireless communication link 16. At the lead controller module 12, the audio signal is received by communication link interface 24, which sends the signal to the processor/user interface 26. The processor/user interface 26 includes equipment to audibly play to the user the recognition result. For example, the processor/user interface 26 includes a suitable amplifier (not shown in the drawings) and a suitable speaker (not shown in the drawings) which is able to audibly play the synthetic speech to the operator.

Any suitable text-to-speech converter could be used without departing from the spirit of the invention. In light of the fact that text-to-speech converters are generally known in the art it is not deemed necessary to describe them here in detail.

Alternatively, in a second specific example of implementation, the recognition results generated by the speech recognition engine 36 are sent to the lead controller module 12 in text form, and it is the processor/user interface 26 that includes the text to speech converter. In such cases, the signal is converted into an audio signal at the lead controller module 12, and is then passed to a suitable amplifier (not shown in the drawings) and a suitable speaker (not shown in the drawings) to audibly play the synthetic speech to the operator.

In yet another example of implementation, the recognition results generated by the speech recognition engine 36 are sent to the lead controller module 12 in text form and are displayed in text form, on a display unit, such as a screen, (not shown in the drawings) which is included as part of processor/user interface 26.

The transmission of the recognition results to the lead controller module 12 is provided as a safety feature to allow the operator to abort a command in cases where the recognition results are incorrect.

Once the operator receives at the recognition results at the lead controller unit 12, and verifies that the recognition result is indicative of the original voice command, the user in enabled to provide a confirmation input signal. Some non-limiting examples of confirmation inputs include uttering the word "yes" or hitting a recognition validation button that is included as part of the processor/user interface 26. The confirmation input received at lead controller unit 12 is then transmitted to processing module 13.

Referring back to processing module 13, the output 40 of the speech recognition engine 36 is also applied to a command verification unit 46. The command verification unit 46 gates the recognition results. If a confirmation has been received from the operator within a specified time period indicating that the recognition result is accurate, the command verification unit 46 will release the recognition result for further processing. If no positive input has been received from the operator within the specified time period, or a negative input has been received from the operator, the command verification unit 46 deletes or otherwise negates the recognition results applied at its input.

In one specific example, the command verification unit 46 will release the recognition results only if the operator has uttered the word "yes" within a certain time frame after reception of the recognition results, say 5 second. The time frame may vary and will generally depend on safety requirements of the system. In a non-limiting example, after the recognition results are input in the command verification unit 46, a timer starts. At the same time, the operator receives the recognition results. If the operator accepts the results, he utters "yes". The new spoken utterance is processed as described previously, and assuming a correct recognition the orthographic representation of the word "yes" appears at the output 40 and it is supplied to the command verification unit 46. If the word "yes" is received before the expiration of the certain time frame, the prior recognition results (conveying the original command) are released by the command verification unit 46. If nothing is received by the command verification unit 46 before the timer stops, the prior recognition results buffered in the command verification unit 46 are deleted. The same operation is performed if any other word than "yes" is received by the command verification unit 46.

In the example of implementation shown in FIG. 5, the architecture of the system is such that the operator will be transmitted the recognition results from the confirmation utterance, namely the word "yes" (assuming correct recognition). In some applications, this might be desirable. In the cases where this is undesirable, the system can be designed such that the recognition result of the confirmation utterance is not sent back to the lead control module.

In a possible variant, a confirmation other than a vocal confirmation can be used. For instance, the lead controller 12 can be provided with a button or switch included in the processor/user interface 26 that the operator needs to actuates in order to confirm the recognition results. This possibility can be implemented by modifying the command verification unit 46 to release the recognition results when a logic signal derived from the manual actuation is received.

In another possible variant, the command verification unit 46 will include a speaker verification module allowing verifying that the operator entering the voice command is an authorized user. Prior to using the system, each authorized user will be asked to provide a respective access voice print associated to a user identification number. A voiceprint is a mathematical representation of the acoustic properties of a spoken utterance. The access voice print will be used to grant access to the control system by performing a similarity measurement between the access voice print and an input utterance provided by the operator. For increased security, in addition to the identification number and access voice print, a speaker verification operation will be performed for each command received from an operator. In this case, command voice prints for each allowable command may be provided by each authorized user prior to using the control system. These command voice prints are stored in records in a computer readable medium and are associated to respective authorized users via their identification number. Once an operator has been granted access to the control system by his access voice print, the corresponding record containing the command voice prints is extracted and used for subsequent speaker verification operations. Consequently, each spoken utterance indicative of a command received by the control system is verified against the corresponding command voice print in the record associated to the given user. If the operator cannot be verified as an authorized user, the system will issue a message indicating that control access is being denied.

When the recognition results are released by command verification unit 46, they are passed to a command encoder 48. The purpose of the command encoder 48 is to encode the command in a format suitable for processing by the control unit 50, which will be described later. Generally stated, the command released by the command verification unit 46 is in orthographic form which may not be suitable for performing analysis such as basic sanity checks and other similar operations to be performed by the control unit 50.

In the present example of implementation, the command encoder 48 converts the command from its orthographic representation to a code-based format. The command encoder 48 can be designed around a database that maps the orthographic representation of a command to its encoded form. The size of the database will depend upon the number of possible commands the processing module 13 is designed to recognize.

The control unit 50 receives the encoded command. One type of processing is to perform a high-level validation or sanity check. For example, when the locomotive is travelling forward and a command is received that specifies a reverse movement, that command may be rejected. In general, the control unit 50 is of known construction and it does not need to be described in detail here. For more information, the reader is directed to the U.S. Pat. Nos. 5,511,749 and 5,685,507 that provide more information on this particular point. The contents of the above documents are incorporated herein by reference.

The data indicative of a command to be executed by the locomotive is then passed to the communication link interface 52 such that it can be transmitted to the follower controller 14 over the communication link 18 or 20.

In an alternative example of implementation, the processing module 13 does not include a control unit 50 for performing the high-level validation or sanity check. Instead, the signals are sent directly from command encoder 48 to the communication link interface 52, and are transmitted to follower controller module 14. In such a case, it is the follower controller module 14 that includes a control unit (not shown) for performing a high-level validation or sanity check. As such, the validity of the command is not verified until the command has been sent to follower controller module 14.

Communication link interface 52 is adapted to transmit signals from processing module 13 to follower controller module 14. Communication link interface 52 has a similar structure to that of communication link interface 24 shown in FIG. 4. In the implementation shown in FIG. 1, wherein the processing module 13 is located within the locomotive, the signal containing data indicative of a command to be executed by the locomotive is transmitted to the follower controller module 14 over communication link 18. Alternatively, in the embodiment wherein the processing module 13 is included as part of the follower controller module 14, the processing module 13 does not include a communication link interface 52. Instead, the signals generated by the command encoder 48 are passed directly from the command encoder 48 to the follower controller module 14 and in response, the follower controller module 14 issues the local command signals to be implemented by the locomotive.

In the implementation shown in FIG. 2, wherein the processing module 13 is located remotely from the locomotive and is in communication with follower controller module 14 via wireless communication link 20, then the signal containing data indicative of a command to be executed by the locomotive is transmitted to the follower controller module 14 over wireless communication link 20.

Figure 6:
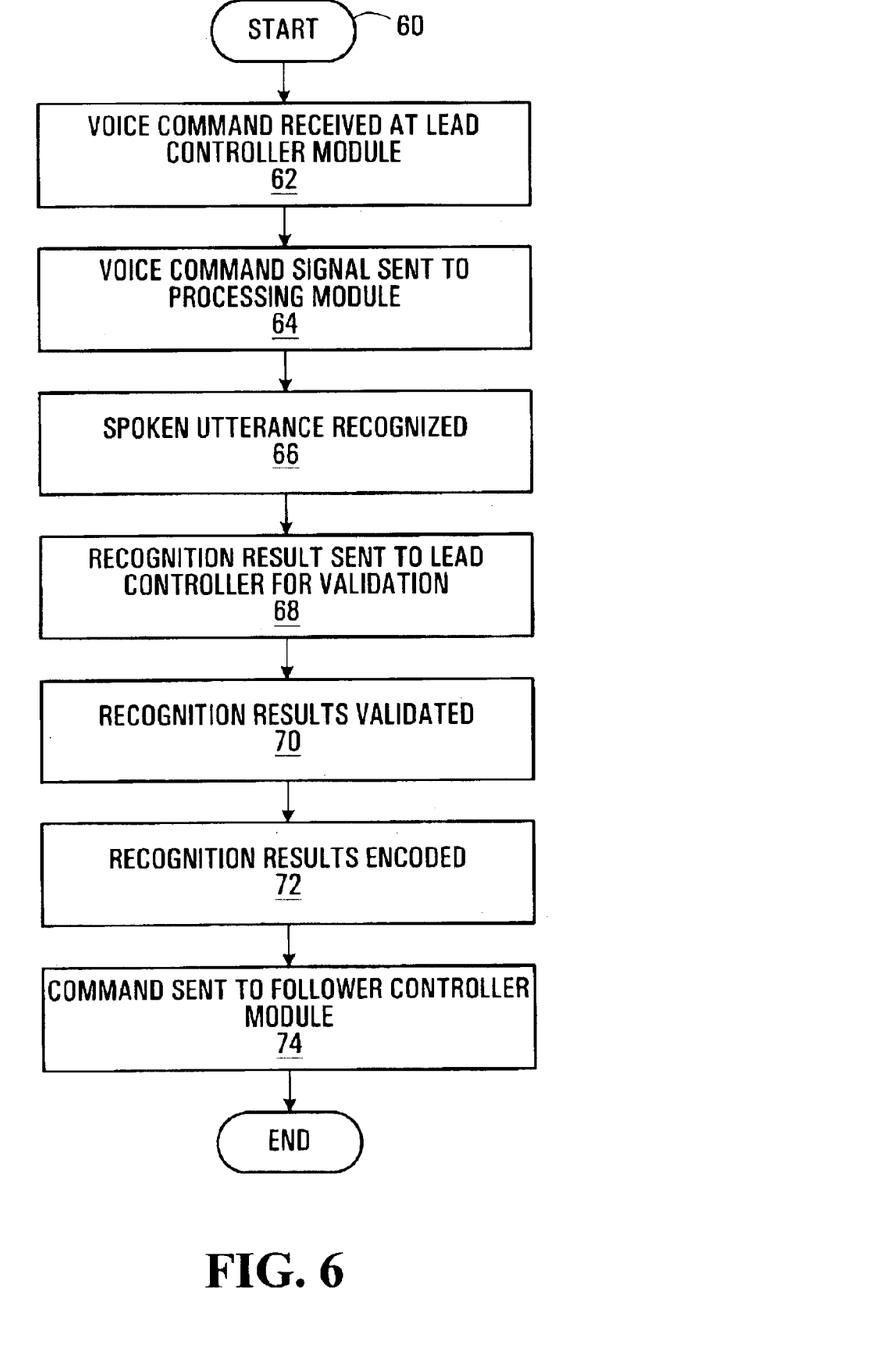
FIG. 6 is a flow-chart illustrating the operation of remote control system for a locomotive shown in FIGS. 1 and 2.

FIG. 6 is a flowchart that summarizes the operation of the remote control system described above. At the step 60, the process starts. At step 62, the vocal command uttered by the operator is received at the voice interface 22 of the lead controller module 12. At step 64, a signal derived from the spoken utterance is transmitted to a processing module 13. At step 66, the processing module 13 applies a speech recognition process and a recognition result is generated. At step 68, the recognition result is transmitted to the lead controller module 12, where it is conveyed to the operator either in audio format or in visual format. At step 70, the recognition results are validated. At step 72, the validated recognition results are passed to a command encoder 46 for encoding and then sent to the control unit 46. At step 74, the command is sent to the follower controller module 14 over a communication link 18 or 20.

Figure 7:
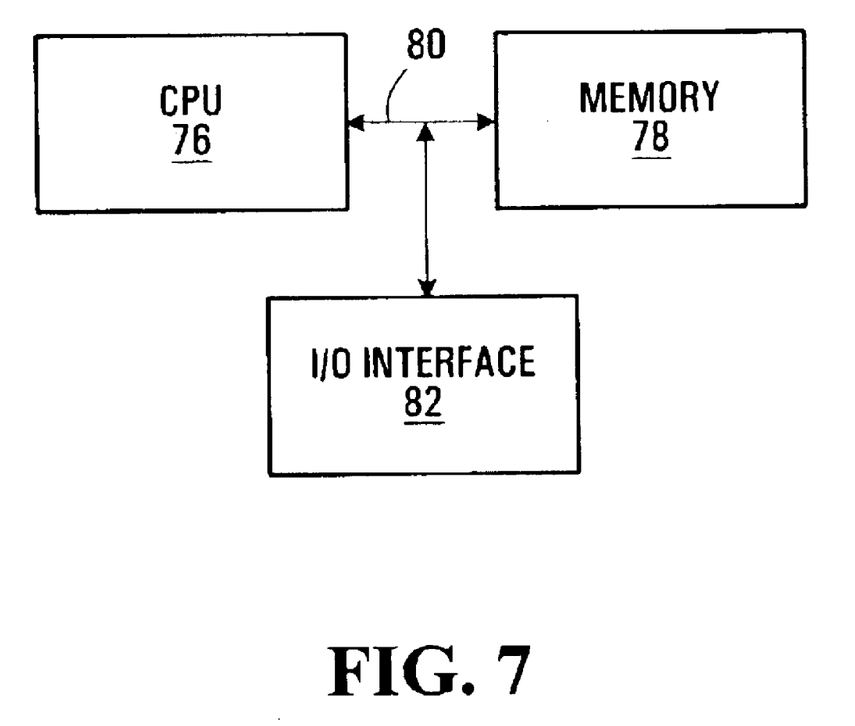
FIG. 7 is a block diagram of a computing platform that can be used to implement some of the components of the remote control system for a locomotive shown in FIGS. 1 and 2.

The functional components of the processing module 13 can in large part be implemented in software executed on a suitable computing platform of the type illustrated in FIG. 7. Such computing platform includes a Central Processing Unit (CPU) 76 connected to a memory 78 over a data bus 80. An Input/Output interface 82 is connected to the data bus 80 and allows the computing platform to exchange signals/data with the external world. The memory 78 is used for holding program instructions of program elements that implement the functionality of components of the processing module 13. Also, the memory 78 is used to hold data on which the program elements operate.

The structure and operation of the follower controller 14 is not described in this specification. For more information the reader is directed to the U.S. Pat. Nos. 5,511,749 and 5,685,507 whose contents are incorporated herein by reference.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A follower controller module adapted for mounting on board a locomotive, said follower controller module comprising a processing module operative for:
    a) receiving a signal indicative of a spoken utterance;
    b) generating in response to the signal received in a) data indicative of a command to be executed by the locomotive;
    c) said follower controller module being responsive to the data indicative of a command to be executed by the locomotive for generating local control signals for issuing to the locomotive so as to cause the locomotive to execute the command.

2. A follower controller module as defined in claim 1, wherein said processing module comprises a communication link interface suitable for receiving a signal indicative of a spoken utterance over a wireless link.

3. A follower controller module as defined in claim 2, wherein the wireless link is a radio frequency link.

4. A follower controller module as defined in claim 2, wherein said processing module includes a speech recognition engine to generate data indicative of at least one vocabulary item as being a match to the spoken utterance.

5. A follower controller module as defined in claim 4, wherein the data indicative of the at least one vocabulary item is an orthographic representation of the at least one vocabulary item.

6. A follower controller module as defined in claim 4, wherein said processing module includes a speech recognition dictionary including a plurality of vocabulary items, said speech recognition engine being coupled to said speech recognition dictionary and being operative to identify amongst the plurality of vocabulary items at least one vocabulary item that is a potential match to the spoken utterance.

7. A follower controller module as defined in claim 6, said follower controller module being adapted to transmit a signal to a lead controller to cause the vocabulary item selected by the speech recognition engine to be conveyed to a human operator.

8. A follower controller module as defined in claim 7, wherein said processing module includes a text-to-speech converter adapted for processing the vocabulary item selected by the speech recognition engine to generate a synthetic audio representation of the vocabulary item, said follower controller module being adapted to transmit a signal to a lead controller indicative of synthetic audio representation of the vocabulary item to cause the vocabulary item selected by the speech recognition engine to be conveyed to a human operator.

9. A follower controller module as defined in claim 7, wherein said processing module includes a command validation unit adapted for validating the data indicative of at least one vocabulary item as being a match to the spoken utterance.

10. A follower controller module as defined in claim 9, wherein the signal derived from a spoken utterance is a first signal, said follower controller being adapted for receiving a second signal indicative of a confirmation signal, said command validation unit being operative to validate the vocabulary item selected as being a match to the spoken utterance at least in part on the basis of the second signal.

11. A remote control system for a locomotive, comprising:
    a) a portable lead controller module;
    b) a follower controller module mounted onboard a locomotive;
    c) a processing module;
    d) said lead controller module and said processing module being operative to establish a wireless communication link therebetween for exchanging data;
    e) said lead controller module being operative to:
        i) receive a signal derived from a spoken utterance;
        ii) transmit the signal derived from a spoken utterance over the wireless communication link to said processing module;
    f) said processing module being operative to:
        i) receive from the lead controller the signal derived from a spoken utterance;
        ii) in response to the signal derived from a spoken utterance, generate data indicative of a command to be executed by the locomotive;
        iii) transmit data indicative of the command to be executed by the locomotive to the follower controller module;
    g) said follower controller module being responsive to the data indicative of a command to be executed by the locomotive for generating local control signals for application to the locomotive to cause the locomotive to execute the command.

12. A remote control system as defined in claim 11, wherein said processing module comprises a communication link interface suitable for receiving the signal indicative of a spoken utterance from the lead controller over the wireless communication link.

13. A remote control system as defined in claim 12, wherein the wireless communication link is a radio frequency link.

14. A remote control system for a locomotive as defined in claim 11, wherein said processing module includes a speech recognition engine to generate data indicative of at least one vocabulary item as being a match to the spoken utterance.

15. A remote control system for a locomotive as defined in claim 14, wherein the data indicative of at least one vocabulary item as being a match to the spoken utterance is an orthographic representation of the at least one vocabulary item.

16. A remote control system for a locomotive as defined in claim 15, wherein said processing module includes a speech recognition dictionary including a plurality of vocabulary items, said speech recognition engine being coupled to said speech recognition dictionary and being operative to identify amongst the plurality of vocabulary items at least one vocabulary item that is a potential match to the spoken utterance.

17. A remote control system for a locomotive as defined in claim 16, wherein said processing module is adapted to transmit a signal to the lead controller to cause the vocabulary item selected by the speech recognition engine to be conveyed to a human operator.

18. A remote control system for a locomotive as defined in claim 17, wherein said processing module is operative to transmit over the wireless communication link to said lead controller module a signal indicative of the vocabulary item selected by the speech recognition engine as being a match to the spoken utterance, said lead controller module being operable to audibly communicate to the human operator the vocabulary item selected by the speech recognition engine as being a match to the spoken utterance.

19. A remote control system for a locomotive as defined in claim 17, wherein said processing module includes a text-to-speech converter for generating the signal conveying the vocabulary item selected by the speech recognition engine as being a match to the spoken utterance in synthetic speech form.

20. A remote control system for a locomotive as defined in claim 15, wherein said processing module includes a command validation unit.

21. A remote control system for a locomotive as defined in claim 20, wherein said command validation unit is operative to validate the data indicative of at least one vocabulary item as being a match to the spoken utterance.

22. A remote control system for a locomotive as defined in claim 21, wherein the signal derived from a spoken utterance is a first signal, said command validation unit being operative to validate the data indicative of at least one vocabulary item as being a match to the spoken utterance in response to a second signal derived from a spoken utterance that is received by said processing module.

23. A remote control system for a locomotive as defined in claim 11, wherein said processing module is part of the follower controller module.

24. A remote control system for a locomotive as defined in claim 11, wherein said processing module is mounted in the locomotive.

25. A remote control system for a locomotive as defined in claim 11, wherein said processing module is located remotely from said lead controller module and said follower controller module, and said follower controller module is in communication with said processing module over a wireless communication link.

26. A remote control system for a locomotive as defined in claim 25, wherein said processing module includes a communication link interface for transmitting over the wireless communication link to the follower unit the data indicative of a command to be executed by the locomotive.

27. A processing module adapted to process voice signals suitable for use in a locomotive remote control system, said processing module comprising:
 a first port for receiving over a wireless communication link a signal derived from a spoken utterance;
 a processing unit operatively coupled to said first port, said processing unit being adapted for processing the signal derived from a spoken utterance to generate data indicative of a command to be executed by a locomotive;
 a second port adapted for releasing the data indicative of a command to be executed by the locomotive to a follower controller module mounted on board a locomotive.

28. A processing module as defined in claim 27, wherein said first port is adapted to receive a signal derived from a spoken utterance over a wireless communication link, the signal derived from the spoken utterance being issued by a lead controller module.

29. A processing module as defined in claim 28, wherein said first port is adapted to receive a plurality of signals issued by a plurality of distinct lead controller modules, wherein each of the plurality of signals is derived from a respective spoken utterance.

30. A processing module as defined in claim 29, wherein each lead controller module in the plurality of distinct lead controller modules is associated to a corresponding follower controller module selected from a plurality of follower controller modules, said processing module being operative for:
 in response to each of the plurality of signals:
  a) generating data indicative of a command to be executed by a locomotive;
  b) transmitting the data generated to a follower controller module selected from a plurality of follower controller modules corresponding to the lead controller module which transmitted the signal from which the data indicative of a command was generated.

31. A processing module as defined in claim 27, wherein the wireless communication link is an RF communication link.

32. A processing module as defined in claim 27, wherein the wireless communication link is a cellular telephone link.

33. A processing module as defined in claim 31, wherein said second port is adapted to release data generated in response to the signal to the follower controller module over a wireless communication link.

34. A processing module as defined in claim 27, wherein said processing unit comprises a speech recognition engine to generate data indicative of at least one vocabulary item as being a match to the spoken utterance.

35. A processing module as defined in claim 34, wherein the data indicative of the at least one vocabulary item is an orthographic representation of the at least one vocabulary item.

36. A processing module as defined in claim 34, wherein said processing unit further comprises a speech recognition dictionary including a plurality of vocabulary items, said speech recognition engine being coupled to said speech recognition dictionary and being operative to identify amongst the plurality of vocabulary items at least one vocabulary item that is a potential match to the spoken utterance.

37. A processing module as defined in claim 36, said first port is adapted to release a for transmission to a lead controller to cause the vocabulary item selected by the speech recognition engine to be conveyed to a human operator.

38. A processing module as defined in claim 37, wherein said processing unit comprises a text-to-speech converter adapted for processing the vocabulary item selected by the speech recognition engine to generate a synthetic audio representation of the vocabulary item, said first port being adapted to transmit a signal to a lead controller indicative of synthetic audio representation of the vocabulary item to cause the vocabulary item selected by the speech recognition engine to be conveyed to a human operator.

39. A processing module as defined in claim 37, wherein said processing unit comprises a command validation unit adapted for validating the data indicative of at least one vocabulary item as being a match to the spoken utterance.

40. A processing module as defined in claim 39, wherein the signal derived from a spoken utterance is a first signal, said first port being adapted for receiving a second signal indicative of a confirmation signal, said command validation unit being operative to validate the vocabulary item selected as being a match to the spoken utterance at least in part on the basis of the second signal.

* * * * *